May 13, 1941.  E. R. JACOBY  2,241,461
FUEL INDUCTION SYSTEM
Filed Oct. 27, 1939  3 Sheets-Sheet 1
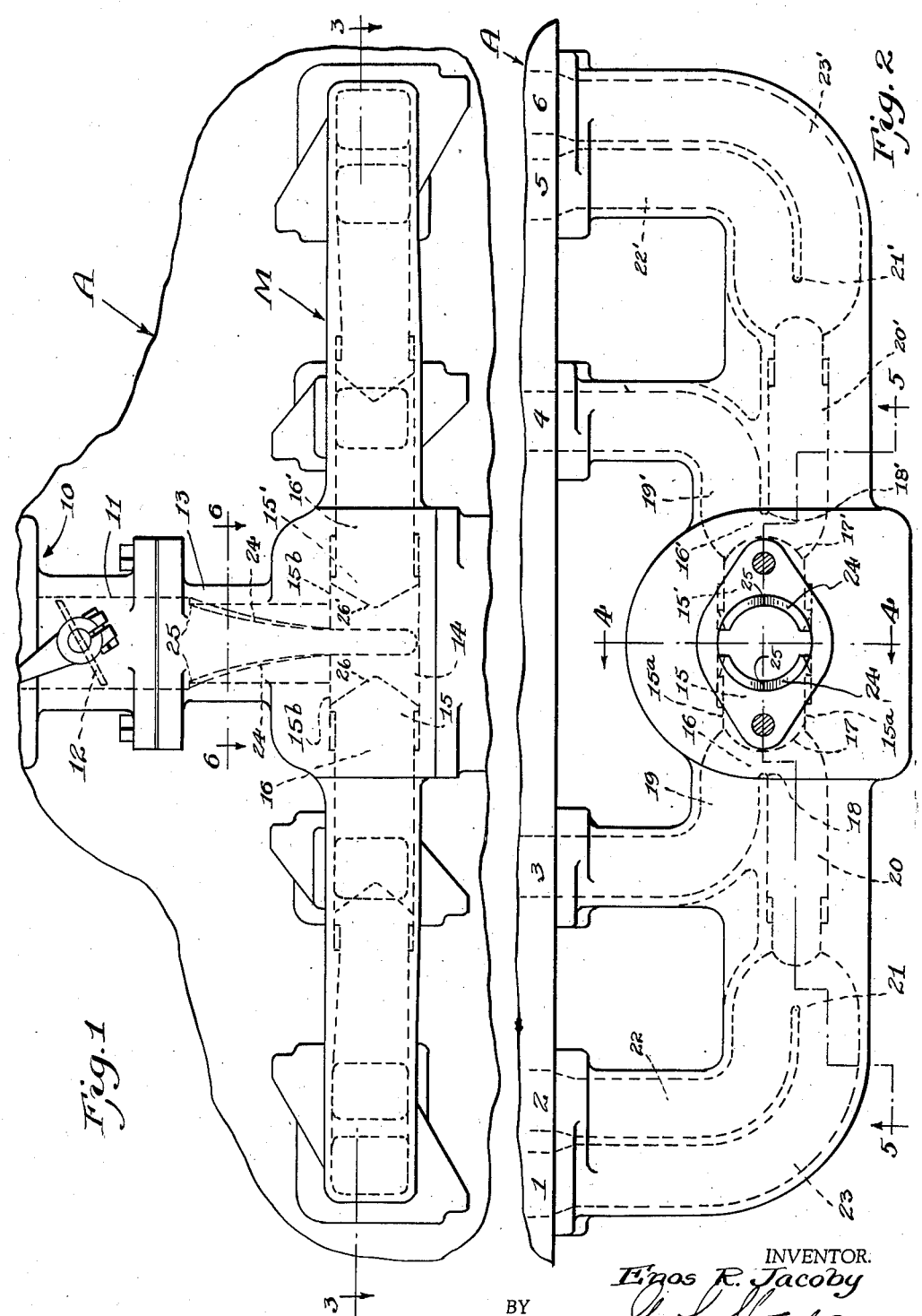
INVENTOR.
Enos R. Jacoby
BY
ATTORNEY.

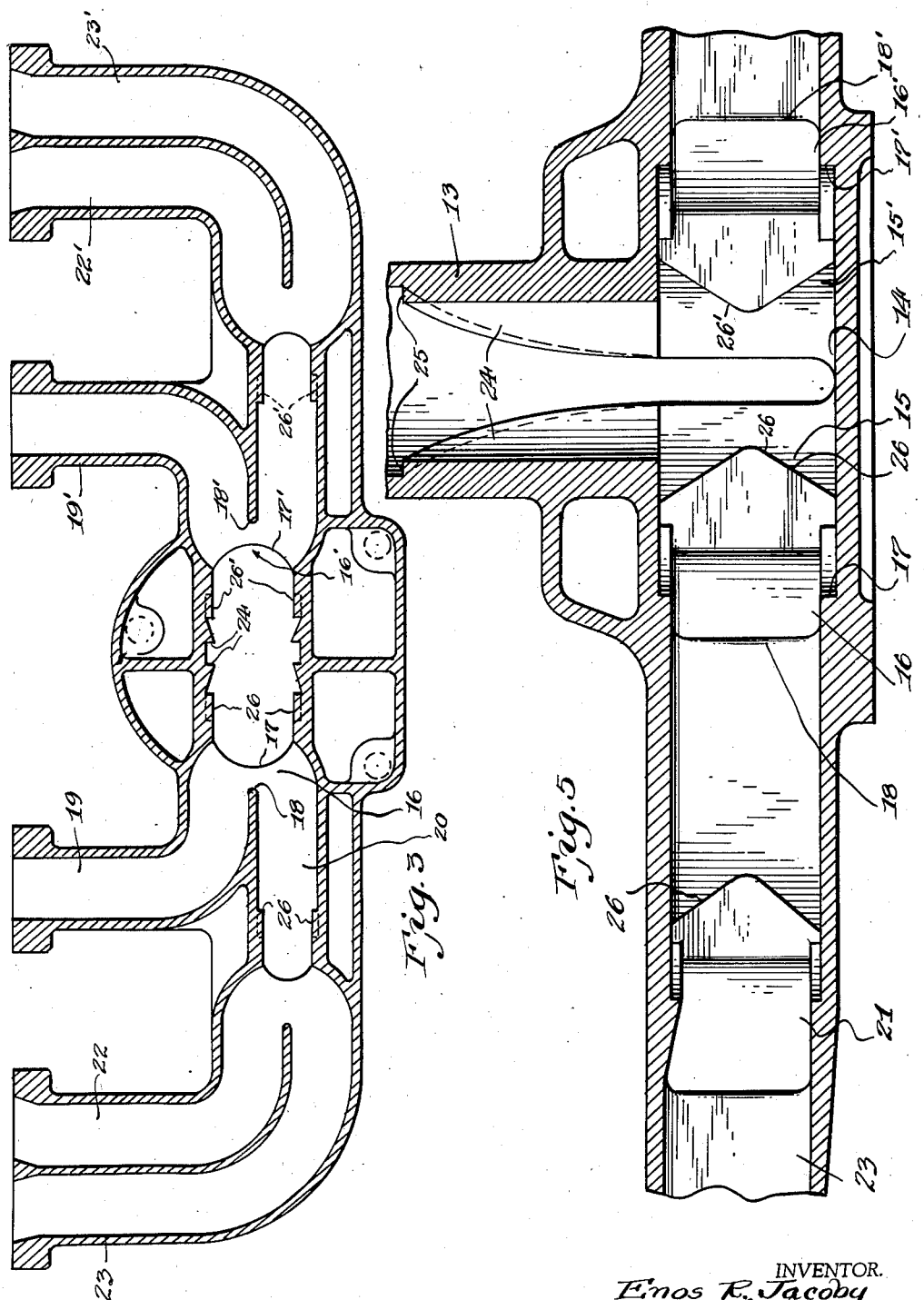

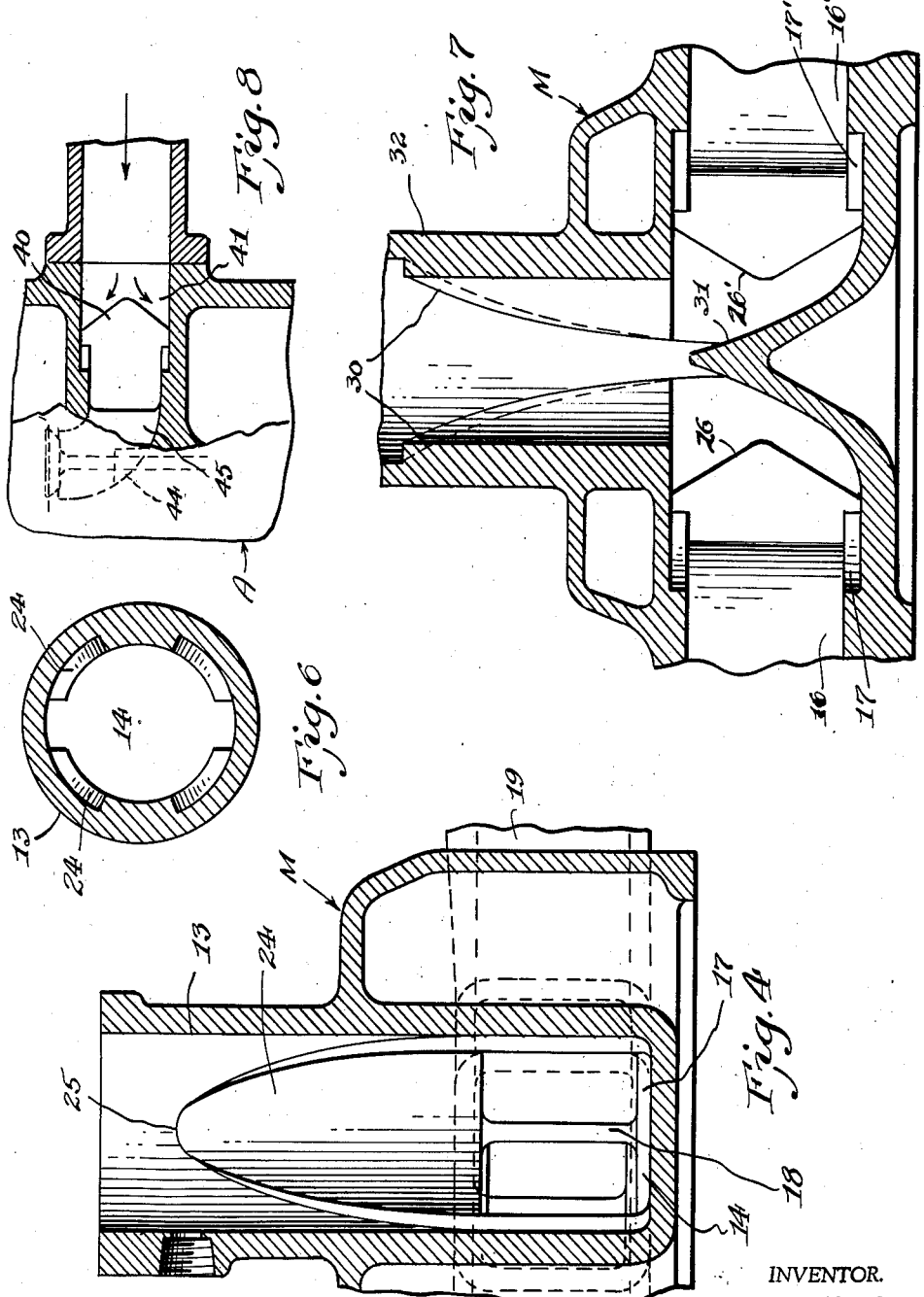

Patented May 13, 1941

2,241,461

UNITED STATES PATENT OFFICE 2,241,461

FUEL INDUCTION SYSTEM

Enos R. Jacoby, Muskegon County, Mich., assignor, by mesne assignments, to Reconstruction Finance Corporation, Detroit, Mich., a corporation of the United States Application October 27, 1939, Serial No. 301,630

17 Claims. (Cl. 123—52)

My invention relates to internal combustion engines and more particularly to a fuel induction system for such engines.

The problem of controlling wet fuel flow in a fuel induction system for internal combustion engines and more particularly in the intake manifold is a difficult one, because of the many conditions which tend to upset the normal fuel flow. Much difficulty has been experienced in controlling wet fuel flow in the riser of a down draft intake manifold, and uncontrolled fuel flow may at times materially effect or upset the uniform distribution of wet fuel into the engine cylinders.

In the past, much has been accomplished in controlling fuel flow in an intake manifold, and more particularly in connection with intake manifolds referred to generally as "individual porting manifolds." It is found quite desirable in most instances to devise a wet fuel flow control ahead of the manifold branches, particularly in the riser portion of a down draft intake manifold in order to commence the control the moment said fuel is introduced in the induction system.

The control of fuel into an internal combustion engine is for the most part had by means of a regulatable butterfly valve located in the fuel conducting passage leading from the engine carburetor to the intake manifold, and generally these butterfly valves are located at the carburetor outlet. However, it is found that such valves have a tendency to induce concentrated wet fuel flow along a portion of a wall of the manifold riser, resulting in an unequal distribution of wet fuel to the manifold branches.

Since in the modern engine unequal or non-uniform fuel distribution interferes with good engine performance, and slight variations in the distribution of fuel to the various engine cylinders often times are quite noticeable in engine operation causing uneven torque impulses, it has become quite important to correct for non-uniform wet fuel flow all along the fuel induction system.

My present invention has for its object to obtain substantially uniform engine performance at all engine speeds and under various load conditions by providing an improved wet fuel controlling device ahead of the usual distributing means which operate to divide and distribute the fuel into the individual cylinder port branches of the intake manifold.

More particularly, these improved results in engine performance are obtained by providing wet fuel controlling dams in the intake manifold riser or primary conducting passage and in the side walls of the lateral manifold runners.

In the present instance these wet fuel controlling devices comprise tapered or inclined wet fuel flow impeding means so located and arranged to cause the wet fuel to flow in a prescribed path and to be acted upon in such a way as to obtain at all times a uniform distribution of the wet fuel to the engine cylinders.

It may be further noted that the present invention is adapted for various types of intake manifolds with equally beneficial results.

For a more detailed understanding of my invention reference may be had to the accompanying drawings illustrating preferred embodiments of my invention, and in which—

Fig. 1 is a side elevational view of my improved intake manifold construction and showing same in connection with an internal combustion engine and showing a fragmentary part of the engine carburetor, Fig. 2 is a plan view thereof, Fig. 3 is a horizontal sectional view of my improved intake manifold taken substantially on the line 3—3 of Fig. 1, Fig. 4 is a transverse sectional view thereof taken substantially on the line 4—4 of Fig. 2, Fig. 5 is a fragmentary detail sectional view taken substantially on the line 5—5 of Fig. 2, Fig. 6 is a sectional view taken substantially on the line 6—6 of Fig. 1, Fig. 7 is a detail view of a modified form of construction, and Fig. 8 is a detail view of a further modified form of construction.

I have chosen for purposes of illustration to show my invention as incorporated with a six cylinder individually ported manifold of substantially conventional construction, though it will be apparent that the principles of my invention may be embodied in other types of intake manifolds as well. In the drawings "A" designates an internal combustion engine, having a conventional carburetor 10 provided with an outlet portion 11 in which is preferably mounted the usual butterfly or throttle valve 12 connected as usual with suitable manual controls.

An intake manifold structure M is secured in any suitable manner to the engine A and comprises in general a primary conducting portion or riser 13 connecting the carburetor outlet portion with the primary distributing chamber 14. Connected with chamber 14 are the oppositely extending lateral conducting portions 15 and 15', which extend to the secondary distributing chambers 16 and 16' respectively.

Associated with the secondary distributing chambers 16 and 16' are the usual arcuate dams 17 and 17', and splits 18 and 18' serving to divide the wet fuel and fuel mixture flow into branches 19—20 and 19'—20' respectively. It will be noted that branches 20 and 20' are further divided as at 21 and 21' to provide port branches 22—23 and 22'—23'. Thus the branches 23, 22 and 19 connect with individual cylinder intake ports 1, 2 and 3 while branches 19', 22' and 23' connect with the cylinder intake ports 4, 5 and 6, respectively.

It has been observed that the butterfly or throttle valve 12 has a tendency to cause a concentrated flow of wet fuel into the downdraft riser substantially along a portion thereof more closely adjacent to the lateral runners or immediately above the entrances opening into said lateral fuel conducting portions 15 and 15', and furthermore there is a tendency for more wet fuel to flow down that portion of the riser wall which is closer to the lower portion of the valve 12, since the wet fuel which impinges on said valve 12 tends to roll off same and is carried to or deposited on the side wall of the riser. Likewise the wet fuel carried in suspension in the fuel mixture flowing past the valve 12 has a tendency to likewise be carried to the same wall of the riser. There is thus a tendency for more wet fuel to flow into the lateral passage 15 than into the lateral passage 15'.

In order to correct this tendency of the wet fuel to flow more into one lateral runner or conducting portion than into the other, I have provided the splitting dams 24 in the wall of the downwardly extending primary fuel conducting portion 13. These dams are arranged to converge near the uppermost portion of the riser and form a rounded split 25 while the lower part of these dams 24 meet the floor of the main distributing chamber substantially equidistant from both lateral conducting portions 15 and 15'.

The wet fuel flowing down the riser wall is thus induced to flow to the side walls 15a of the lateral conducting portions instead of to the top wall 15b. Dams 26 and 26' are respectively constructed in the side walls of the lateral runners 15 and 15' and are convex or pointed as shown particularly in Fig. 5 to divide said wet fuel flow and distribute same substantially equally to the top and bottom walls of said lateral runners.

The wet fuel is thus caused to be uniformly distributed to the lateral conducting portions 15 and 15' and is as well futher divided and distributed substantially equally along the top and bottom walls of said lateral runners, resulting finally in more uniformly distributing the wet fuel to the engine cylinders.

In Fig. 7 showing a modified construction the dams 30, somewhat similar to dams 24 shown in Figs. 1 to 6 inclusive, are constructed to converge on the central transverse dividing baffle or split 31 projecting toward riser 32. In Fig. 8 I have illustrated side wall dams 40 located in an intake fuel conducting passage 41 within the engine block 42 ahead of wet fuel and fuel mixture dividing means 43 in said block for dividing said passage 41 into two branch passages 44 and 45. It may be noted that dams or wet fuel impeding means of the character shown in these drawings may be located in any downwardly extending or laterally connecting fuel conducting passage to correct wet fuel flow along said passage and thus obtain a uniform wet fuel distribution to the engine cylinders.

The intake manifold construction described above has successfully corrected unequal and non-uniform wet fuel flow and has resulted in smoother engine performance.

It may be observed that I have provided means acting on the wet fuel flowing down the walls of said riser or primary fuel conducting portion which divides and diverts said wet fuel flow to both side walls of the primary distributing chamber and thus along both side walls of the lateral fuel conducting portions, the side walls of the primary distributing chamber being preferably constructed substantially flush with the side walls of said lateral fuel conducting portions. This wet fuel flowing along both side walls of the lateral fuel conducting portions is then divided and substantially equal amounts thereof are diverted to the top and bottom walls of said lateral runners or fuel conducting portions ahead of the junction of the lateral fuel conducting portions 15 and 15' with said branch passages 19—20 and 19'—20'. It will thus be seen that I have obtained vastly superior results to anything heretofore obtained and that a uniform distribution of the wet fuel is obtained at all times at all engine speeds and under all conditions of engine load.

It will be apparent that modifications and changes may be made herein without departing from the spirit of my invention as defined in the claims appended hereto.

I claim:

1. A fuel induction system for an internal combustion engine comprising a source of fuel supply, a primary fuel conducting portion extending downwardly from said source of fuel supply, a primary fuel distributing chamber, and oppositely extending secondary fuel conducting passages connecting said chamber at opposite ends only with the engine cylinder intake ports, and wet fuel impeding means on the wall of said primary conducting portion and acting on wet fuel flow for deflecting same to flow in a predetermined path toward substantially the central portion only of the closed side wall of said distributing chamber and substantially uniformly distributed to said secondary fuel conducting passages.

2. A fuel induction system for an internal combustion engine comprising a source of fuel supply, a primary fuel conducting portion extending downwardly from said source of fuel supply, a primary fuel distributing chamber, and secondary fuel conducting passages connecting the ends only of said chamber with the engine cylinder intake ports, and wet fuel impeding means on the wall of said primary conducting portion and acting on the wet fuel flow to divert same to flow along another portion of said wall and to be conducted substantially to the central portion only of the closed side wall of said distributing chamber.

3. A fuel induction system for an internal combustion engine comprising a source of fuel supply, a primary fuel conducting portion extending downwardly from said source of fuel supply, a primary fuel distributing chamber, and secondary fuel conducting passages connecting said chamber at the ends only with the engine cylinder intake ports, and wet fuel impeding means located on the wall portion of said primary fuel conducting portion of said primary fuel conducting portion lying substantially above the entrance opening into said secondary fuel conducting passages and acting to deflect wet fuel flow to the closed side wall of said distributing chamber.

4. A fuel induction system for an internal combustion engine comprising a source of fuel supply, a primary fuel conducting portion extending downwardly from said source of fuel supply, a primary fuel distributing chamber, and secondary fuel conducting passages connecting said chamber at the ends only with the engine cylinder intake ports, and wet fuel impeding means located on the wall portion of said primary fuel conducting portion of said primary fuel conducting portion lying substantially above the entrance opening into said secondary fuel conducting passages, said means comprising diverging dams acting to divert the wet fuel flow to the midpoint of the closed wall portion of said primary fuel conducting portion lying to the side of the entrance opening at the ends of said distributing chamber.

5. A fuel induction system for an internal combustion engine comprising a source of fuel supply, a primary fuel conducting portion extending downwardly from said source of fuel supply, a primary fuel distributing chamber, and secondary fuel conducting passages connecting said chamber with the engine cylinder intake ports, and wet fuel impeding means located on the wall portion of said primary fuel conducting portion lying substantially above the entrance opening into said secondary fuel conducting passages, said means comprising diverging dams acting to divert the wet fuel flow to the wall portion of said primary fuel conducting portion lying to the side of the entrance opening into said secondary fuel conducting passages, and second fuel impeding means located on the side wall of said secondary fuel conducting passages constructed and arranged to divide and divert the wet fuel flow to the top and bottom walls thereof.

6. A fuel induction system for an internal combustion engine comprising a source of fuel supply, valving means for controlling the flow of fuel from said source of fuel supply, a primary fuel conducting portion extending downwardly from said source of fuel supply, a primary fuel distributing chamber communicating with said primary fuel conducting portion, oppositely extending lateral fuel conducting portions communicating with said primary distributing chamber, a plurality of port branches communicating with said lateral conducting portion and means at the junction of said port branches and said lateral fuel conducting portions for dividing and distributing said fuel into said port branches, said valving means inducing a concentrated wet fuel flow downwardly along that wall portion of the primary fuel conducting portion lying substantially immediately above the entrance opening into said lateral fuel conducting portions, and wet fuel flow impeding means on the said wall portion and acting on said concentrated wet fuel flow to divert same to the side walls of said lateral fuel conducting portions.

7. A fuel induction system for an internal combustion engine comprising a source of fuel supply, valving means for controlling the flow of fuel from said source of fuel supply, a primary fuel conducting portion extending downwardly from said source of fuel supply, a primary fuel distributing chamber communicating with said primary fuel conducting portion, oppositely extending lateral fuel conducting portions communicating with said primary distributing chamber, a plurality of port branches communicating with said lateral conducting portion and means at the junction of said port branches and said lateral fuel conducting portions for dividing and distributing said fuel into said port branches, said valving means inducing a concentrated wet fuel flow downwardly along that wall portion of the primary fuel conducting portion lying substantially immediately above the entrance opening into said lateral fuel conducting portions, and wet fuel flow impeding means on the said wall portion and acting on said concentrated wet fuel flow to divert same to the side walls of said lateral fuel conducting portions, said wet fuel flow impeding means comprising sloping dams.

8. A fuel induction system for an internal combustion engine comprising a source of fuel supply, valving means for controlling the flow of fuel from said source of fuel supply, a primary fuel conducting portion extending downwardly from said source of fuel supply, a primary fuel distributing chamber communicating with said primary fuel conducting portion oppositely extending lateral fuel conducting portions communicating with said primary distributing chamber, a plurality of port branches communicating with said lateral conducting portion and means at the junction of said port branches and said lateral fuel conducting portions for dividing and distributing said fuel into said port branches, said valving means inducing a concentrated wet fuel flow downwardly along that wall portion of the primary fuel conducting portion lying substantially immediately above the entrance opening into said lateral fuel conducting portions, and wet fuel flow impeding means on the said wall porton and acting on said concentrated wet fuel flow to divert same to the side walls of said lateral fuel conducting portions, said wet fuel flow impeding means comprising diverging dams terminating on the side wall of said primary distributing chamber.

9. A fuel induction system for an internal combustion engine comprising a source of fuel supply, valving means for controlling the flow of fuel from said source of fuel supply, a primary fuel conducting portion extending downwardly from said source of fuel supply, a primary fuel distributing chamber communicating with said primary fuel conducting portion, oppositely extending lateral fuel conducting portions communicating with said primary distributing chamber, a plurality of port branches communicating with said lateral conducting portion and means at the junction of said port branches and said lateral fuel conducting portions for dividing and distributing said fuel into said port branches, said valving means inducing a concentrated wet fuel flow downwardly along that wall portion of the primary fuel conducting portion lying substantially immediately above the entrance opening into said lateral fuel conducting portions, and wet fuel flow impeding means on the said wall portion and acting on said concentrated wet fuel flow to divert same to the side walls of said lateral fuel conducting portions, said wet fuel flow impeding means comprising diverging dams terminating on the side wall of said primary distributing chamber, said side walls of said distributing chamber extending substantially flush with the side walls of said lateral fuel conducting portions.

10. A fuel induction system for an internal combustion engine comprising a source of fuel supply, valving means for controlling the flow of fuel from said source of fuel supply, a primary fuel conducting portion extending downwardly from said source of fuel supply, a primary fuel distributing chamber communicating with said primary fuel conducting portion, oppositely extending lateral fuel conducting portions communicating with said primary distributing chamber, a plurality of port branches communicating with said lateral conducting portion and means at the junction of said port branches and said lateral fuel conducting portions for dividing and distributing said fuel into said port branches, said valving means inducing a concentrated wet fuel flow downwardly along that wall portion of the primary fuel conducting portion lying substantially immediately above the entrance opening into said lateral fuel conducting portions, and wet fuel flow impeding means on the said wall portion and acting on said concentrated wet fuel flow to divert same to the side walls of said lateral fuel conducting portions, said wet fuel flow impeding means comprising diverging dams extending downwardly along the side walls of said primary distributing chamber to the floor thereof.

11. A fuel induction system for an internal combustion engine comprising a source of fuel supply, valving means for controlling the flow of fuel from said source of fuel supply, a primary fuel conducting portion extending downwardly from said source of fuel supply, a primary fuel distributing chamber communicating with said primary fuel conducting portion, oppositely extending lateral fuel conducting portions communicating with said primary distributing chamber, a plurality of port branches communicating with said lateral conducting portion and means at the junction of said port branches and said lateral fuel conducting portions for dividing and distributing said fuel into said port branches, said valving means inducing a concentrated wet fuel flow downwardly along that wall portion of the primary fuel conducting portion lying substantially immediately above the entrance opening into said lateral fuel conducting portions, and wet fuel flow impeding means on the said wall portion and acting on said concentrated wet fuel flow to divert same to the side walls of said lateral fuel conducting portions, said wet fuel flow impeding means comprising diverging dams terminating on the side wall of said primary distributing chamber, and a second wet fuel flow impeding means located on the side walls of said lateral fuel conducting portions and acting on the wet fuel flowing along said walls to divide and divert said wet fuel flow to the top and bottom walls of said lateral fuel conducting portions.

12. A fuel induction system for an internal combustion engine comprising a source of fuel supply, valving means for controlling the flow of fuel from said source of fuel supply, a primary fuel conducting portion extending downwardly from said source of fuel supply, a primary fuel distributing chamber communicating with said primary fuel conducting portion, oppositely extending lateral fuel conducting portions communicating with said primary distributing chamber, a plurality of port branches communicating with said lateral conducting portion and means at the junction of said port branches and said lateral fuel conducting portions for dividing and distributing said fuel into said port branches, said valving means inducing a concentrated wet fuel flow downwardly along that wall portion of the primary fuel conducting portion lying substantially immediately above the entrance opening into said lateral fuel conducting portions, and wet fuel flow impeding means on the said wall portion and acting on said concentrated wet fuel flow to divert same to the side walls of said lateral fuel conducting portions, said wet fuel flow impeding means comprising diverging dams terminating on the side wall of said primary distributing chamber, and a second wet fuel flow impeding means located on the side walls of said lateral fuel conducting portions and acting on the wet fuel flowing along said walls to divide and divert said wet fuel flow to the top and bottom walls of said lateral fuel conducting portions, said second wet fuel flow impeding means comprising dams.

13. A fuel induction system for an internal combustion engine comprising a source of fuel supply, valving means for controlling the flow of fuel from said source of fuel supply, a primary fuel conducting portion extending downwardly from said source of fuel supply, a primary fuel distributing chamber communicating with said primary fuel conducting portion, oppositely extending lateral fuel conducting portions communicating with said primary distributing chamber, a plurality of port branches communicating with said lateral conducting portion and means at the junction of said port branches and said lateral fuel conducting portions for dividing and distributing said fuel into said port branches, said valving means inducing a concentrated wet fuel flow downwardly along that wall portion of the primary fuel conducting portion lying substantially immediately above the entrance opening into said lateral fuel conducting portions, and wet fuel flow impeding means on the said wall portion and acting on said concentrated wet fuel flow to divert same to the side walls of said lateral fuel conducting portions, said wet fuel flow impeding means comprising diverging dams terminating on the side wall of said primary distributing chamber, and a second wet fuel flow impeding means located on the side walls of said lateral fuel conducting portions and acting on the wet fuel flowing along said walls to divide and divert said wet fuel flow to the top and bottom walls of said lateral fuel conducting portions, said second wet fuel flow impeding means comprising diverging dams terminating substantially at the top and bottom walls of said lateral fuel conducting portions ahead of said fuel dividing and distributing means at the junction of said port branches and said lateral conducting portions.

14. In a fuel induction system for internal combustion engines having intake ports and including a primary fuel conducting portion, a primary fuel distributing chamber communicating with said primary fuel conducting portion, and lateral fuel conducting portions openingly communicating with said primary distributing chamber, means for dividing and diverting the wet fuel flowing along the walls of said primary conducting portion in substantially equal amounts to the side walls of said lateral conducting portions, and a second means for dividing and diverting the wet fuel flowing along the side walls of said lateral conducting portions in substantially equal amounts to the top and bottom walls of said lateral conducting portions.

15. In a fuel induction system for internal combustion engines having intake ports and including a primary fuel conducting portion, a primary fuel distributing chamber communicating with said primary fuel conducting portion, and lateral fuel conducting portions openingly communicating with said primary distributing chamber, means for dividing and diverting the wet fuel flowing along the walls of said primary conducting portion in substantially equal amounts to the side walls of said lateral conducting portions, and a second means for dividing and diverting the wet fuel flowing along the side walls of said lateral conducting portions in substantially equal amounts to the top and bottom walls of said lateral conducting portions, branch conduits connecting said lateral fuel conducting portions with the engine intake ports, and means beyond the aforesaid second dividing means and located adjacent the junction of said branch conduits and said lateral fuel conducting portions for dividing said wet fuel flowing along the top and bottom walls of said lateral fuel conducting portions.

16. A fuel induction system for an internal combustion engine including a fuel conducting conduit having top, bottom and side walls, branch conduits connecting said first conduit with engine intake means, means at the junction of said conduits and acting on the wet fuel flowing along the top and bottom walls of said first conduit for dividing and distributing the wet fuel in predetermined proportions to said branch conduits, and means located ahead of said dividing means and constructed and arranged to act on the wet fuel flowing along the side walls of said first conduit to divide and divert the wet fuel aforesaid to the top and bottom walls of said first conduit.

17. A fuel induction system for an internal combustion engine including a fuel conducting conduit having top, bottom and side walls, branch conduits connecting said first conduit with engine intake means, and fuel impeding means located on the side walls of said first conduit and acting on the wet fuel to divide and divert same to the top and bottom wall thereof.

ENOS R. JACOBY.